J. F. BRADLEY.
BEAD POSITIONING DEVICE.
APPLICATION FILED JULY 14, 1917.
1,241,913.
Patented Oct. 2, 1917.
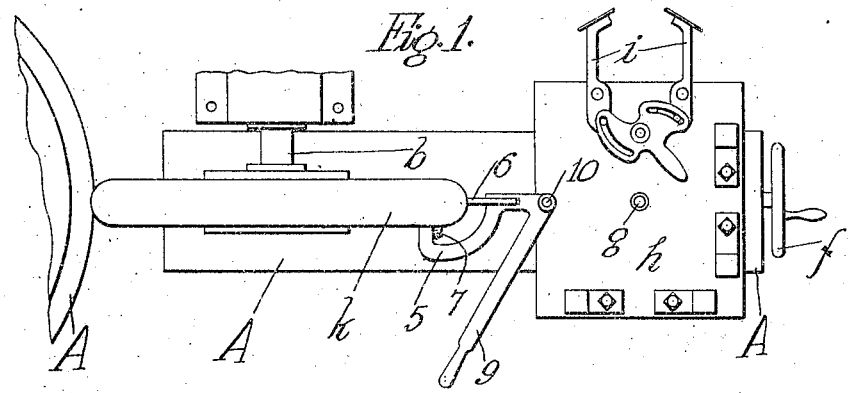
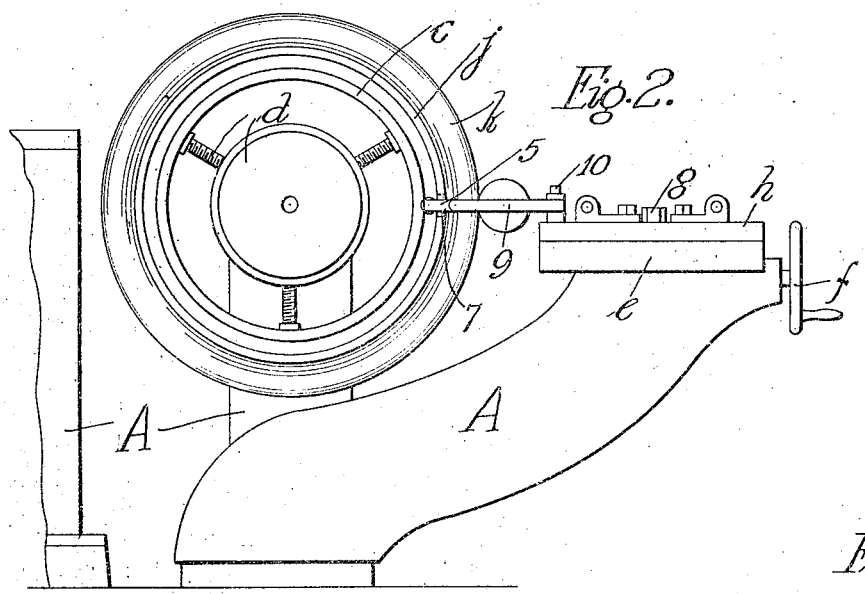
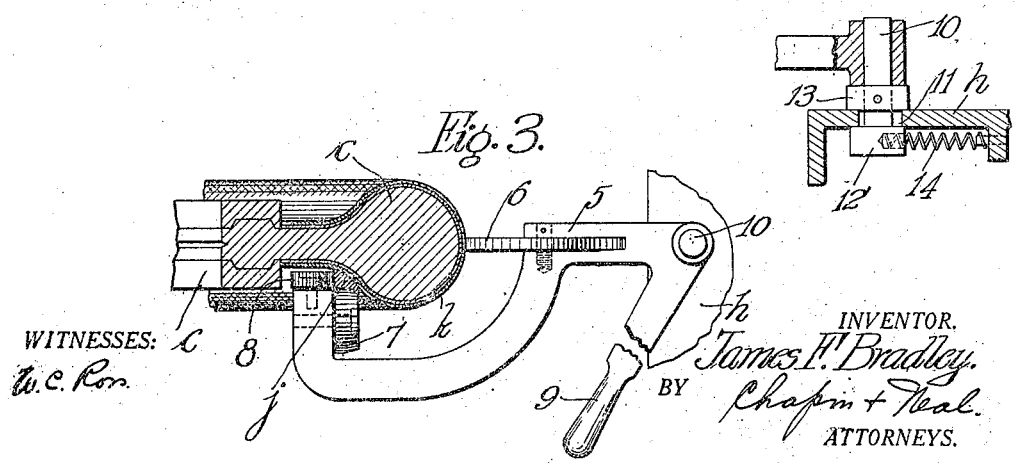
WITNESSES:
INVENTOR.
James F. Bradley.
BY Chapin + Neal
ATTORNEYS.

UNITED STATES PATENT OFFICE.

JAMES FRANCIS BRADLEY, OF WEST SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

BEAD-POSITIONING DEVICE.

1,241,913.   Specification of Letters Patent.   Patented Oct. 2, 1917.

Application filed July 14, 1917. Serial No. 180,613.

*To all whom it may concern:*

Be it known that I, JAMES FRANCIS BRADLEY, a citizen of the United States of America, residing at West Springfield, in the county of Hampden and State of Massachusetts, have invented certain new and useful Improvements in Bead-Positioning Devices, of which the following is a specification.

This invention relates generally to tire building machines and more particularly to an improved means for machines of this character, whereby the bead rings may be applied and accurately positioned relatively to the body of the tire.

In the manufacture of tire shoes, the general practice is to form the tire upon a suitable core ring which is removably and rotatably mounted in the machine. The tire shoe is built upon the core and subsequently the core ring with the shoe thereon is removed from the machine and placed in a mold wherein the shoe is vulcanized. The first step in building up the shoe consists in applying one or more layers of fabric, previously skim coated or saturated with rubber, to the core. The bead rings are then placed on the partially formed shoe and thereafter other layers of rubberized fabric are applied. The usual outer structure of the shoe is then formed and the shoe is ready for vulcanization.

During the building of the shoe, various tire making tools, mounted on a revoluble turret, are brought successively into operation on the partially formed shoe on the core ring, including bead positioning and setting devices. The bead rings must be accurately positioned in true concentrical relation with the tire shoe particularly with the tread portion thereof, for the bead rings constitute the means for attaching the shoe to a rim and also must properly fit into recesses in the shoe. The difficulty encountered in a machine of the character described is in accurately centering the core ring on its driving shaft, for with the ordinary bead setting tools, unless the core is exactly concentric with its shaft, the bead ring will be eccentrically positioned on the tire shoe.

This invention has for its object to provide a bead positioning tool, particularly adapted for use in tire building machines, which has, in addition to bead positioning and setting means, a guiding device adapted to ride upon the tread portion of the partially formed shoe and hold the said means at a constant distance from the tread portion, so that the bead is located in true concentrical relation with the tread portion of the shoe without necessitating accurate concentrical positioning of the core ring with relation to its driving shaft.

Other objects and advantages will appear in the following description and will be particularly pointed out in the appended claims.

The invention, in an embodiment at present preferred, is shown for illustrative purposes in the accompanying drawings, in which—

Figure 1 is a fragmentary plan view of a tire building machine embodying the improved bead positioning device;

Fig. 2 is a front elevational view thereof;

Fig. 3 is an enlarged fragmentary plan view with parts in section; and

Fig. 4 is a detail sectional view illustrative of the mounting of the bead positioning device.

Referring to these drawings in detail, A represents the frame of a tire building machine. The latter includes a horizontally arranged shaft *b* which is suitably supported in frame A and adapted to be driven in any suitable manner, usually at varying speeds as desired by the operator. The end of shaft *b* is arranged to removably support an annular core ring *c*, which may be of any suitable type, the external configuration of ring *c* corresponding to the desired internal configuration of the tire shoe to be formed thereon. Ring *c* is removably supported from shaft *b* by a suitable expansible clutching mechanism *d*. The latter has been illustrated in conventional form merely and further illustration and description of the mechanism is thought unnecessary to an understanding of the invention, as such mechanisms are generally well known in the art.

Laterally spaced from shaft *b* is a carriage *e* which is mounted for horizontal sliding movement on frame A and may be moved toward or away from the periphery of the core *c* by a hand wheel *f* and other suitable parts (not shown) in the usual known manner. Rotatably mounted on a stud $g$ from the carriage $e$ is a turret $h$ and the center of stud $g$ is arranged to lie in the central vertical plane of the core ring $c$ when the latter is supported as described from shaft $b$. Upon the turret $h$, various tire making tools are mounted, one set thereof being indicated conventionally at $i$, and these tools are adapted to be successively brought into operation in building up a tire shoe upon the core $c$ in the usual and well known way.

This invention is primarily concerned with an improved device for positioning the bead ring on a partially formed tire shoe. The improved device consists of a tool which is adapted to be removably supported upon the described turret $h$. Referring to Fig. 3, the tool consists of a bent arm 5 and three rolls 6, 7 and 8 which are rotatably mounted on the arm, the latter having an integral lever portion 9. A vertical stud 10 mounted on turret $h$ is adapted to fit within a suitable hole adjacent the intersection of the arm and lever portions 5 and 9, respectively, to support the tool.

Preferably, although not necessarily, the stud 10 is mounted for sliding movement on the turret to and from the core ring. For example, the stud 10 may be mounted as shown in Fig. 4, so that a portion thereof is slidable in a slot 11 in turret $h$. The stud has a head 12 thereon engageable with the under face of turret $h$ and a collar 13 to engage the upper face of the latter and support the stud. A spring 14, arranged between head 12 and a lug depending from turret $h$, forces the stud and thus the tool thereon toward the core ring $c$.

When the bead positioning tool is supported from the turret, as shown in Figs. 1 to 3, the roll 6 is adapted to ride centrally upon the outer periphery of the core ring $c$ or more properly upon the partially formed tire shoe thereon, as will appear. The axis of roll 6 is arranged to lie in parallel relation with the axis of the described shaft $b$, and the axes of the latter and roll 6 lie in a common horizontal plane, in which the axes of rolls 7 and 8 also lie. The axes of the latter are arranged at right angles to one another, the axis of roll 8 being parallel with that of roll 6. The rolls 7 and 8 nearly touch at one point and form a substantially square corner to receive a bead ring $j$, which is to be applied to a partially formed tire body $k$ on the core ring $c$. The widths of rolls 7 and 8 are only slightly less than the lengths of the respective faces of the bead ring $j$ which they are adapted to engage.

In building up a tire shoe, a core ring $c$ is mounted upon shaft $b$ by means of the mechanism $d$ in the usual manner. Foundation layers of fabric $k$, previously saturated to the core ring, as shown in Fig. 3, the layers being pressed to the core and adhering thereto. Having applied the foundation layers of fabric $k$, the bead $j$ is then applied. The bead, previously formed, is usually an endless annular ring of the cross sectional shape shown in Fig. 3.

In applying the bead ring $j$, the turret $h$ is turned into the position shown in the usual known manner, and the bead positioning tool is placed on stud 10. With the tool positioned so that rolls 7 and 8 are swung slightly away from the core ring $c$, the operator places the bead in position upon the rolls. Then holding the bead ring so that it is approximately concentrical with the core ring, the lever 9 is moved to swing rolls 6, 7 and 8 into the position shown in Fig. 3. It is important to note that the operator may move lever 9 with his leg, hip, or body to force the bead $j$ against the tire, thus leaving both hands free to hold the bead ring. The latter is sticky as is also the fabric $k$ and the two adhere with a sufficiently strong bond when the ring is forced against the fabric by rolls 7 and 8.

As soon as a small portion of the bead ring has been fastened as described, the core ring $c$ is rotated and, as the latter revolves, the operator maintains pressure on lever 9 so that the remaining portions of the bead ring are positioned and pressed to the fabric. As soon as the bead ring has been applied on one side of the fabric on core $c$, the tool is removed from stud 10, turned upside down, and replaced on the stud so that the other bead ring may be applied in a like manner.

It often happens that the core ring $c$ is not in exact concentrical relation with shaft $b$ and to insure that the bead ring $j$ is applied in exact concentrical relation with the core ring irrespective of any eccentricity of the latter with relation to shaft $b$, the roll 6 is provided and forms the principal feature of this invention. Since the bead rings constitute the means for attaching the tire shoe to its rim and since they must accurately fit within recesses in a mold during the vulcanization of the tire, it is most desirable that the bead rings be accurately positioned, both in true concentrical relation with the tire shoe and at the proper radial distance from the tread of the latter. This is effectively accomplished by roll 6 which is always forced against the outer peripheral portion of the fabric $k$.

Preferably roll 6 is forced against the latter by the described spring 14, although the spring need not necessarily be used, although its broad function is necessary. For example, without the spring, the roll 6 could be moved to and fro, for the carriage $e$ may have more or less play relatively to the mechanism operated by wheel pressure on lever 9 which holds the roll in engagement with the fabric $k$. The eccentricity of the core ring relatively to shaft $b$ is usually so small that the necessary movement of stud 10 can be obtained as described without the use of spring 14, although the latter is more desirable and accordingly the preferred construction.

It will thus be seen, that as ring $c$ is revolved, the roll 6 functions to automatically move the bead into exact concentrical relation with the outer periphery of fabric $k$ for the rolls 7 and 8 act together to press the bead to the fabric so that it adheres to the latter in the accurately located position. The roll 6, riding on the fabric, constantly maintains rolls 7 and 8 in the desired position relatively to the tread portion of fabric $k$, as distinguished from a tool fixed on the turret with which inaccurate positioning of the bead ring would be obtained unless the core ring is exactly centered on shaft $b$.

Thus, an improved bead positioning tool for tire building machines has been provided which is particularly characterized in that the rings may be accurately located in proper relation with the tread portion of the tire and which is furthermore characterized in that the tool is conveniently operable to obtain the accurate positioning of the bead with little effort on the part of the operator.

The invention has been described in a preferred form for illustrative purposes, but the scope of the invention is defined by the appended claims rather than by the foregoing description.

What I claim is—

1. In a tire building machine, a revoluble ring core upon which the tire carcass may be built, a support adjacent the core, means mounted on said support to position and set the bead of the tire upon the carcass on said core, and a guiding device on said means to ride on the tread portion of the carcass and control the proper positioning of the bead with respect to the tread, so that the latter is placed in true concentrical relation with the tread portion of the tire.

2. A tool for use in tire making, comprising, an arm, means thereon adapted to engage a tire bead, a guiding device adapted to ride on the tread portion of a partially formed tire shoe, and a lever to move said device and means, whereby the latter may be forced against the partially formed tire shoe to apply the bead thereto and said device may be held against the tread portion of the shoe to gage the positioning of the bead in proper relation therewith.

3. In a tire building machine, a removable and revoluble ring core upon which a tire carcass may be built, a turret adjacent said core, an arm movably mounted on the turret, means on the arm to position and set the bead of the tire upon the carcass on said core, a guide roll on the arm to ride on the tread portion of the carcass and a lever to force said means and roll against the carcass, all constructed and arranged so that the roll controls the positioning of the bead, whereby the latter may be positioned in true concentrical relation with the tread portion of the tire.

4. In a tire building machine, a revoluble ring core removably mounted therein, a turret adjacent the core, an arm movably mounted on the turret, a guide roll on the arm adapted to engage the tread portion of a partially formed tire shoe on the core, means to move the roll toward said core, bead setting rolls on the arm, and a lever portion on the latter to force said rolls toward the core, all constructed and arranged so that the bead is set in place on the partially formed tire shoe in true concentrical relation with the tread portion thereof.

5. In a tire building machine, a revoluble ring core removably mounted therein, a turret adjacent the core, an arm removably mounted on the turret, bead setting devices on the arm, the latter being reversible so that said devices may be positioned on either side of the core ring, a guide roll on the arm adapted to ride on the tread portion of a partially formed tire shoe on said core, and a lever portion to move said device toward the core to set the bead in position on the partially formed shoe, all constructed and arranged so that said roll maintains said devices a constant distance from the tread portion of the shoe, whereby the bead may be positioned in true concentrical relation with the tread portion.

6. In a tire building machine, a revoluble ring core upon which a tire carcass may be built, a turret adjacent the core, an arm movably mounted on the turret, a guiding means on the arm to ride on the tread portion of the carcass, bead setting devices on the arm arranged to be held a constant distance from the tread portion by said means and a lever on the arm arranged for convenient actuation by the leg of the operator, all constructed and arranged so that the latter may move the lever to apply a bead ring to the carcass with both hands left free to support the bead.

JAMES FRANCIS BRADLEY.